US012420440B2

(12) United States Patent
Li

(10) Patent No.: US 12,420,440 B2
(45) Date of Patent: Sep. 23, 2025

(54) ELECTRIC HAIR CLIPPER WITH A HAIR SUCTION FUNCTION

(71) Applicant: Wuhan Shernbao Pet Products Manufacturing Co., Ltd., Wuhan (CN)

(72) Inventor: Lei Li, Nanchang (CN)

(73) Assignee: Wuhan Shernbao Pet Products Manufacturing Co., Ltd., Wuhan (CN)

(*) Notice: Subject to any disclaimer, the term of this patent is extended or adjusted under 35 U.S.C. 154(b) by 337 days.

(21) Appl. No.: 18/097,007

(22) Filed: Jan. 13, 2023

(65) Prior Publication Data

US 2024/0051163 A1 Feb. 15, 2024

(30) Foreign Application Priority Data

Aug. 15, 2022 (CN) ........................ 202222146063.0

(51) Int. Cl.
*B26B 19/44* (2006.01)
*B26B 19/38* (2006.01)

(52) U.S. Cl.
CPC .......... *B26B 19/44* (2013.01); *B26B 19/3853* (2013.01)

(58) Field of Classification Search
CPC ... B26B 19/44; B26B 19/3853; B26B 19/386; B26B 19/3833; B62B 19/38; A47L 7/0066; A47L 9/322
See application file for complete search history.

(56) References Cited

U.S. PATENT DOCUMENTS 3,943,948 A * 3/1976 Sartore .................. A45D 29/02 30/28
2018/0281214 A1* 10/2018 Snow ...................... B26B 19/44

FOREIGN PATENT DOCUMENTS

| | | | | |
|---|---|---|---|---|
| CN | 108202348 A | * | 6/2018 | |
| CN | 110228085 A | * | 9/2019 | |
| CN | 110480688 A | * | 11/2019 | B26B 19/14 |
| CN | 112792853 A | * | 5/2021 | B26B 19/3806 |
| CN | 112976063 A | * | 6/2021 | |
| DE | 212018000415 U1 | * | 3/2021 | B26B 19/44 |
| EP | 1775080 A1 | * | 4/2007 | B26B 19/06 |
| KR | 20110137011 A | * | 12/2011 | |

* cited by examiner

*Primary Examiner* — Jennifer S Matthews
(74) *Attorney, Agent, or Firm* — Hawaii Patent Services; Nathaniel K. Fedde; Kenton N. Fedde

(57) ABSTRACT

An electric hair clipper with a hair suction function, which comprises a casing, a cutter head component, a battery component, a motor component and a control board; on the upper surface of the casing corresponding to its front end is a sagging installation part. On the rear side wall of the installation part is a hair suction inlet. At the rear end of the casing is a negative pressure loading port, and on the inside of the casing is a negative pressure channel; on the installation part is a head cover whose rear port is always connected with the hair suction inlet; when the front end of the head cover is separated from the bottom wall of the installation part, a suction channel connecting with the hair suction inlet can be formed between the head cover and the installation part.

9 Claims, 4 Drawing Sheets

ELECTRIC HAIR CLIPPER WITH A HAIR SUCTION FUNCTION

TECHNICAL FIELD

The present invention relates to the technical field of hair cutting appliances, in particular to an electric hair clipper with a hair suction function.

BACKGROUND

Electric hair clippers are common hair cutting appliances for cutting human or animal hair; existing electric hair clipper generally comprises a casing, a cutter head component installed at the front end of the casing, and a motor, a battery component and a control board set in the casing. The motor drives the moving blade of the cutter head component at the front end through an eccentric transmission member to perform a lateral alternating motion to make the fixed blade of the cutter head component cut hair. Generally, the existing electric hair clippers are only used for hair cutting. When the existing electric hair clippers are used to cut hair, especially used to cut long and thin hair of pets, the hair removed from the pets is liable to float in the air and scatter everywhere, making it hard to clean up. So it is necessary to improve the cutting appliances.

SUMMARY OF THE INVENTION

The present invention aims to overcome the defects in the prior art and provide an electric hair clipper with a hair suction function. By connecting with a negative pressure source (vacuum cleaner), the electric hair clipper can suck and collect hair during cutting, thus avoiding hair scattering effectively.

In order to serve the above purpose, the present invention provides an electric hair clipper with a hair suction function, which comprises a casing, a cutter head component, a battery component, a motor component and a control board. The said cutter head component is removably installed on the front end of the casing, and the said battery component, motor component and control board are all installed in the casing;

A sagging installation part is set on the upper surface of the front end corresponding to the said casing. A hair suction inlet is set on the rear side wall of the said installation part. A negative pressure loading port for connecting with the negative pressure source is set on the rear end of the said casing. A negative pressure channel is set between the hair suction inlet corresponding to the inside of the said casing and the negative pressure loading port;

The installation part of the said casing is openably installed with a head cover, the cross section of the said head cover is a "n-shaped" structure, and the rear port of the said head cover is always connected with the hair suction inlet;

When the front end of the said head cover is pulled up to separate from the bottom wall of the installation part, the said head cover and the installation part form a suction channel connecting with the hair suction inlet;

When the front end of the said head cover is pressed down to cover the bottom wall of the installation part, the said head cover works with the installation part to close the hair suction inlet.

Further, the said casing comprises an upper cover, a lower cover and a mounting bracket set between the upper and lower covers; the said mounting bracket has a "Z" structure, which comprises a first fitting part, a second fitting part, and a connecting part connected with the first and second fitting parts. The said first fitting part and the top wall of the upper cover form a first channel butt-jointed with the hair suction inlet. The said second fitting part and the bottom wall of the lower cover form a second channel butt-jointed with the negative pressure loading port. The said connecting part forms a connecting channel connecting the first and second channels.

Further, on the top wall of the said upper cover is a first upper fitting rib extending downward, and, correspondingly, on the bottom wall of the said lower cover is a first lower fitting rib extending upward and matching the first upper fitting rib;

On the rear side of the bottom wall of the said lower cover corresponding to the first lower fitting rib is also a second lower fitting rib that extends upward and matches the connecting part of the mounting bracket;

A motor chamber for installing the motor component is exclusively set between the structure formed by the first upper and lower fitting ribs corresponding to the said casing and the structure formed by the connecting part and the second lower fitting rib.

Further, on the upper surface of the said second fitting part is formed a battery compartment for installing the battery component.

Further, on the upper surface of the said second fitting part are a number of holding frames for holding the control board along the opening of the battery compartment at intervals.

Further, when the front end of the said head cover is pressed down to cover the bottom wall of the installation part, the said head cover and the outer surface of the casing are subject to a smooth transition.

Further, the said head cover comprises a top plate and wing plates on both sides of the top plate. The rear end of the said top plate is provided with rotary support feet matching the upper inner wall of the hair suction inlet, and on the upper inner wall of the said hair suction inlet is, correspondingly, a structure matching the rotary support feet;

At the installation part of the said casing are sockets matching the wing plates on both sides of the head cover.

Further, on the said wing plates are arc guide notches, and in the said sockets are guide blocks matching the guide notches.

Further, at least two limiting fasteners are set on the front ends of the said wing plates.

Further, at the rear end of the said casing is removably connected a connecting pipe fitting.

Compared with the prior art, the structure of the present invention is simple and reasonable. By switching the opening/closing states of the head cover, the electric hair clipper can be switched between an ordinary one and a special one with a hair suction function. When the hair suction function is enabled, the cut hair can be sucked and collected through the hair suction inlet by connecting the negative pressure loading port with the negative pressure source, hence avoiding hair scattering effectively.

The following reference marks are marked based on the figures:

100. Casing; 1. Upper cover; 11. Installation part; 111. Socket; 112. Guide block; 12. Hair suction inlet; 13. First upper fitting rib; 2. Lower cover; 21. First lower fitting rib; 22. Second lower fitting rib; 23. Negative pressure loading port; 3. Mounting bracket; 31. First fitting part; 32. Second fitting part; 321. Battery compartment; 322. Holding frame; 33. Connecting part; 4. Head cover; 41. Top plate; 411. Rotary support foot; 42. Wing plate; 421. Guide notch; 422. Limiting fastener; 5. Connecting pipe fitting; 200. Cutter head component; 300. Motor component; 400. Battery component; 500. Control board; A. Suction channel; B. First channel; C. Second channel; D. Connecting channel; E. Motor chamber.

SPECIFIC EMBODIMENT

A specific embodiment of the present invention is described in detail below in combination with the figures, but it should be known that the protection scope of the present invention is not limited by the specific embodiment.

Figure 1:
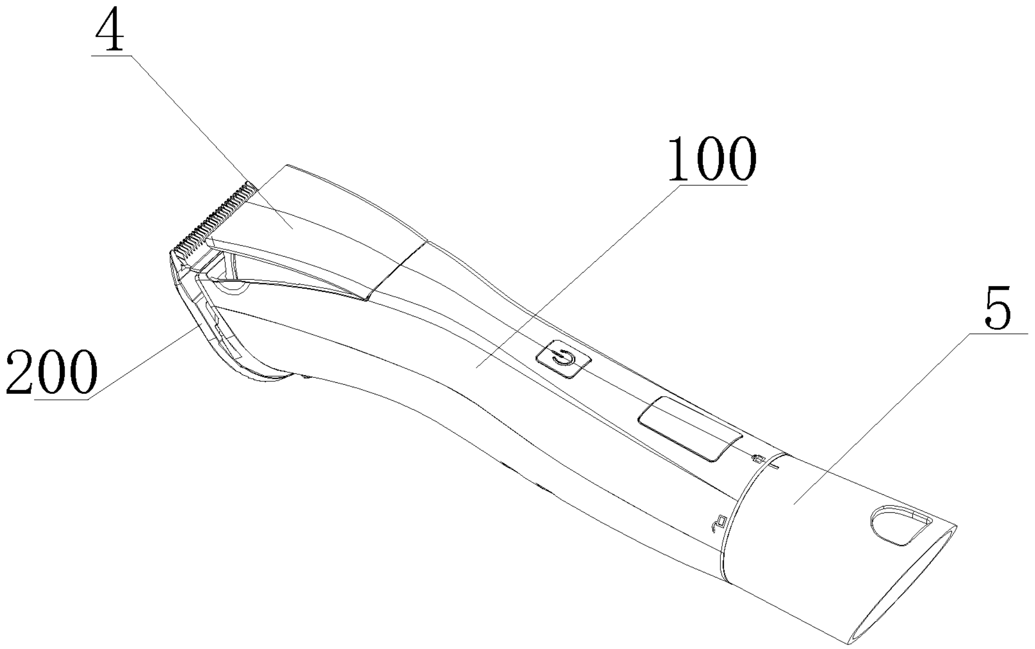
FIG. 1 shows the 3D structure of an electric hair clipper of the present invention with a hair suction function (the head cover is open)
Figure 2:
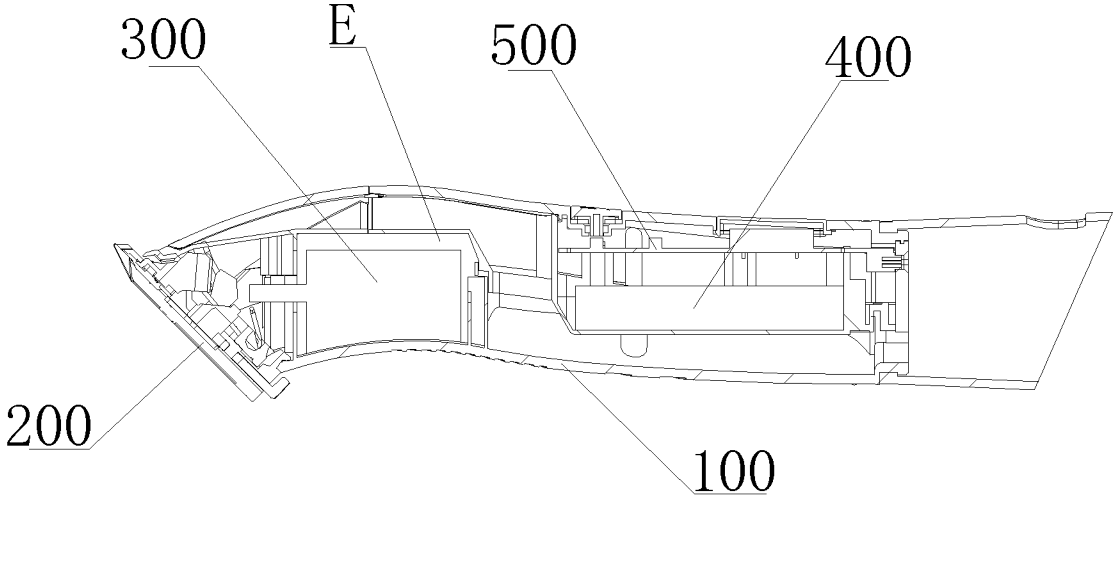
FIG. 2 shows the Vertical Profile Structure I of the electric hair clipper (the head cover is closed)
Figure 3:
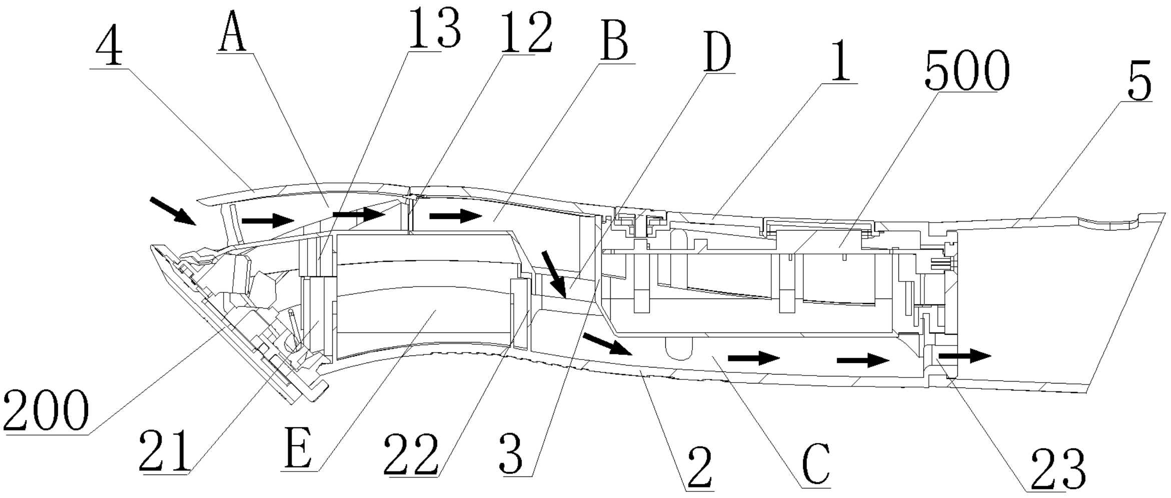
FIG. 3 shows the Vertical Profile Structure II of the electric hair clipper (the head cover is open)
Figure 4:
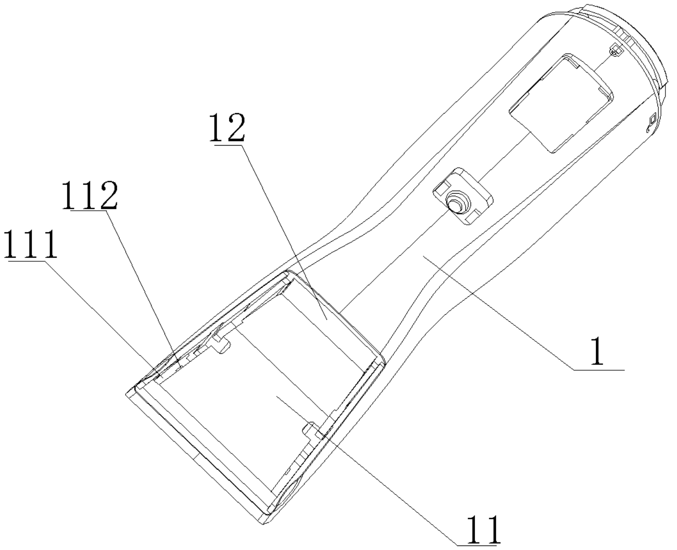
FIG. 4 shows the 3D structure of the upper cover.
Figure 5:
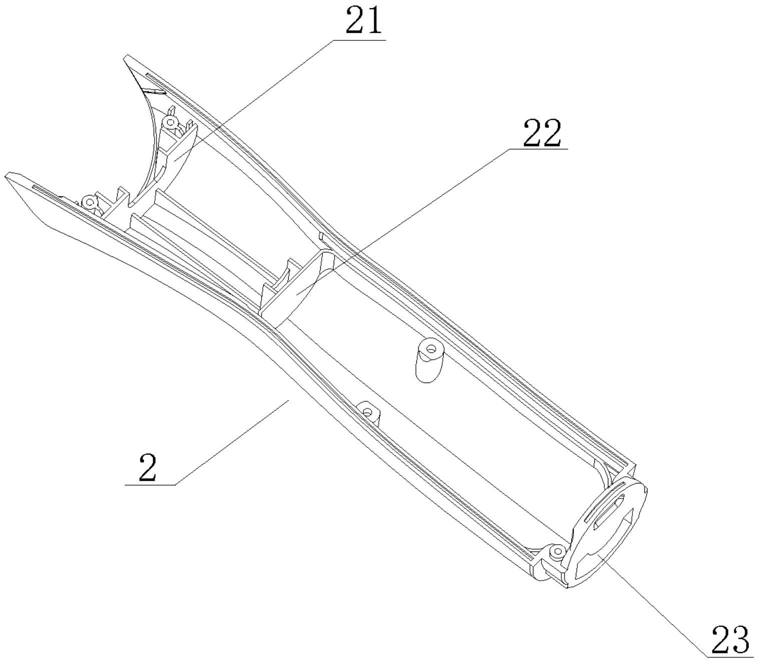
FIG. 5 shows the 3D structure of the lower cover.
Figure 6:
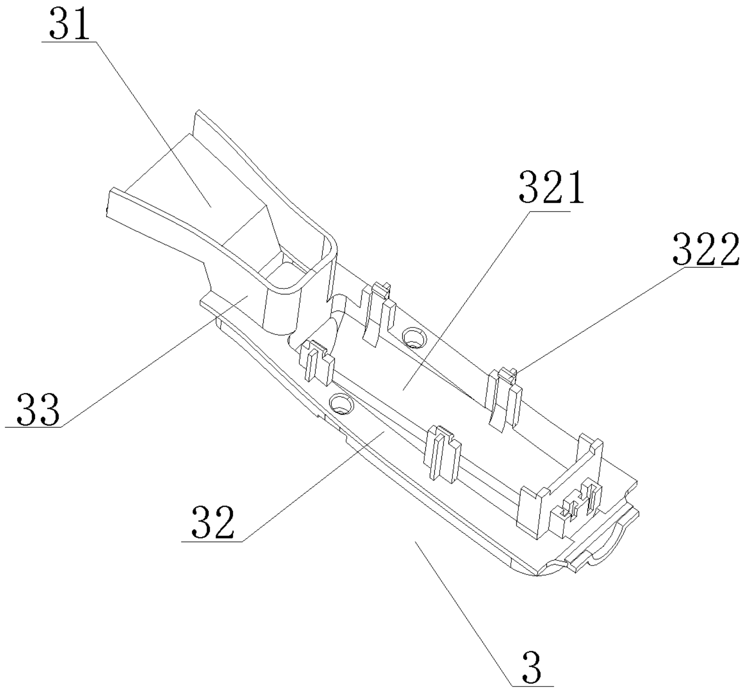
FIG. 6 shows the 3D structure of the mounting bracket.
Figure 7:
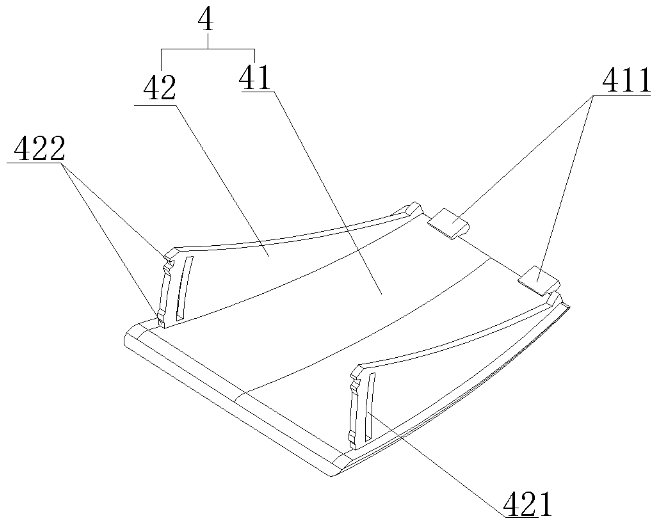
FIG. 7 shows the 3D structure of head cover.

As shown in FIG. 1, the present invention relates to an electric hair clipper with a hair suction function which comprises a casing 100, a cutter head component 200, a battery component 400, a motor component 300 and a control board 500. The cutter head component 200 is removably installed on the front end of the casing 100, and the motor component 300, battery component 400 and control board 500 are all installed in the casing 100; the motor component 300 is used to drive the cutter head component 200, so that the moving blade of the cutter head component 200 can move laterally and alternately on the fixed blade for hair cutting; the battery component 400 is connected with the motor component 300 and control board 500; the control board 500 is used for controlling the working state of the motor component 300.

Specifically, a sagging installation part 11 is set on the upper surface of the front end of the casing 100. A hair suction inlet 12 is set on the rear side wall of the installation part 11. A negative pressure loading port 23 is set on the rear end of the casing 100 for connecting with a negative pressure source (vacuum cleaner, etc.). A negative pressure channel connecting the hair suction inlet 12 and negative pressure loading port 23 is set inside the casing 100; the casing 100 is openably installed with an head cover 4 at the corresponding installation part 11. The cross section of this head cover 4 is a "n-shaped" structure, and the rear port is always connected with the hair suction inlet 12; when the front end of the head cover 4 is pulled up to separate it from the bottom wall of the installation part 11 (open), the head cover 4 and the installation part 11 form a Suction Channel A connecting the dust suction inlet, and therefore, at this time, the hair suction function of electric hair clipper is enabled. After connecting the negative pressure loading port 23 of the casing 100 with the negative pressure source (vacuum cleaner, etc.), the suction channel A connecting with the hair suction inlet 12 can generate a suction force, thus the hair cut by the electric hair clipper can be continuously sucked and collected, avoiding hair scattering effectively. Preferably, at the rear end of the casing 100 is removably connected a connecting pipe fitting 5 for the sake of easy butt jointing with the vacuum pipe of the negative pressure source (vacuum cleaner, etc.); when the front end of the head cover 4 is pressed down to cover the bottom wall of the installation part 11 (closed), the head cover 4 can work with the installation part 11 to close the hair suction inlet 12. At this time, the ordinary electric hair clipper mode can be enabled, and preferably, at this time, the end face of the head cover 4 and the outer surface of the casing 100 are subject to a smooth transition.

In the above scheme, specifically, the head cover 4 comprises a top plate 41 and wing plates 42 on both sides of the top plate 41. At the rear end of the top plate 41 is rotary support feet 411 extending into the hair suction inlet 12 and matching the upper inner wall of the hair suction inlet 12. On the upper inner wall of the hair suction inlet 12 is, correspondingly, a structure matching the rotary support feet 411, so that the head cover 4 can be turned up and down to open and close through the rotary support feet 411; the installation part 11 of the casing 100 is, correspondingly, furnished with sockets 111 matching the wing plates 42 on both sides of the head cover 4, thus the turning of the head cover 4 can be constrained to open or close the head cover 4; preferably, the wing plates 42 on both sides of the head cover 4 are provided with arc guide notches 421, and the sockets 111 of the installation part 11 are correspondingly provided with guide blocks 112 matching the guide notches 421, thus the motion of the head cover 4 can be further constrained; preferably, the front ends of the wing plates 42 are provided with at least two limiting fasteners 422 matching the front end walls of the sockets 111 to achieve fastening, thus opening and closing of the head cover 4 can be allowed.

In the above scheme, specifically, the casing 100 comprises an upper cover 1, a lower cover 2, and a mounting bracket 3 set between the upper cover 1 and lower cover 2; the mounting bracket 3 has a "Z-shaped" structure, which includes a first fitting part 31 and a second fitting part 32 at the upper and lower ends, respectively, and a connecting part 33 connected between the first fitting part 31 and second fitting part 32. The first fitting part 31 and the top wall of the upper cover 1 form a first channel B butt jointing with the hair suction inlet 12, and the second fitting part 32 and the bottom wall of the lower cover 2 form a second channel C butt jointing with the negative pressure loading port 23. The connecting part 33 forms a connecting channel D connecting the first channel B and the second channel C. The first channel B, connecting channel D and second channel C form a complete negative pressure channel.

In the above scheme, on the upper surface of the second fitting part 32 of the mounting bracket 3 is formed a battery compartment 321 for installing the battery component 400. On the upper surface of the second fitting part 32 are a number of holding frames 322 for holding the control board 500 along the opening of the battery compartment 321 at intervals, thus the space of the casing 100 can be reasonably used to install the battery component 400 and control board 500, and the structure can be more compact and convenient for the miniaturized design of the electric hair clipper.

In the above scheme, on the top wall of the front end of the upper cover 1 is a first upper fitting rib 13 extending downward, and on the bottom wall of the lower cover 2 is, correspondingly, a first lower fitting rib 21 extending upward and matching the first upper fitting rib 13; at the rear side of the bottom wall of the lower cover 2 corresponding to the first lower fitting rib 21 is also a second lower fitting rib 22 that extends upward and matches the connecting part 33 of the mounting bracket 3. In this way, a motor chamber E for installing the motor component 300 is exclusively set between the structure formed by the first upper fitting rib 13 and first lower fitting rib 21 corresponding to the casing 100 and the structure formed by the connecting part 33 and the second lower fitting rib 22.

Compared with the prior art, the structure of the present invention is simple and reasonable. By switching the opening/closing states of the head cover, the electric hair clipper can be switched between an ordinary one and a special one with a hair suction function. When the hair suction function is enabled, the cut hair can be sucked and collected through the hair suction inlet by connecting the negative pressure loading port with the negative pressure source, hence avoiding hair scattering effectively.

The above disclosure is only an embodiment of the present invention; however, the present invention is not limited to this. Any changes that can be considered by those skilled in the art should be kept within the protection scope of the present invention.

The invention claimed is:

1. An electric hair clipper with a hair suction function, including a casing, a cutter head component, a battery component, a motor component and a control board;

the cutter head component is removably installed on a front end of the casing;

the battery component, motor component and control board are all installed in the casing;

wherein a sagging installation part is set on an upper surface of the front end corresponding to the casing, a hair suction inlet is set on a rear side wall of the installation part, a negative pressure loading port for connecting with a negative pressure source is set on a rear end of the casing, and a negative pressure channel is formed between the hair suction inlet corresponding to an inside of the casing and the negative pressure loading port;

the installation part of the casing is openably installed with a head cover, a cross section of the head cover is an "n-shaped" structure, and a rear port of the head cover is always connected with the hair suction inlet;

when the front end of the head cover is pulled up to separate from a bottom wall of the installation part, a suction channel connecting with the hair suction inlet can be formed between the head cover and the installation part;

when the front end of the head cover is pressed down to cover the bottom wall of the installation part, the head cover can work with the installation part to close the hair suction inlet;

wherein the casing comprises an upper cover, a lower cover, and a mounting bracket set between the upper and lower covers;

the mounting bracket has a "Z-shaped" structure, which comprises a first fitting part, a second fitting part, and a connecting part connected with the first and second fitting parts;

the first fitting part and a top wall of the upper cover form a first channel butt-jointed into the hair suction inlet;

the second fitting part and a bottom wall of the lower cover form a second channel butt-jointed with the negative pressure loading port; and the connecting part forms a connecting channel connecting the first and second channels.

2. The electric hair clipper with a hair suction function according to claim 1, which is characterized in that on the top wall of the upper cover is a first upper fitting rib extending downward;

on the bottom wall of the lower cover is a first lower fitting rib extending upward and matching the first upper fitting rib;

on a rear side of the bottom wall of the lower cover corresponding to the first lower fitting rib is also a second lower fitting rib that extends upward and matches the connecting part of the mounting bracket;

a motor chamber for installing the motor component is exclusively set between a structure formed by the first upper fitting rib and first lower fitting rib corresponding to the casing and the structure formed by the connecting part and the second lower fitting rib.

3. The electric hair clipper with a hair suction function according to claim 1, which is characterized in that an upper surface of the second fitting part forms a battery compartment for installing the battery component.

4. The electric hair clipper with a hair suction function according to claim 3, which is characterized in that on the upper surface of the second fitting part are a number of holding frames for holding the control board along an opening of the battery compartment at intervals.

5. The electric hair clipper with a hair suction function according to claim 1, which is characterized in that when the front end of the head cover is pressed down to cover the bottom wall of the installation part, the head cover and an outer surface of the casing are subject to a smooth transition.

6. The electric hair clipper with a hair suction function according to claim 1, which is characterized in that the head cover comprises a top plate and wing plates on both sides of the top plate;

at a rear end of the top plate are rotary support feet matching the upper inner wall of the hair suction inlet; and on an upper inner wall of the hair suction inlet is a structure matching the rotary support feet;

at the installation part of said casing are sockets matching the wing plates on both sides of the head cover.

7. The electric hair clipper with a hair suction function according to claim 6, which is characterized in that on the wing plates are arc guide notches, and in the sockets are guide blocks matching the guide notches.

8. The electric hair clipper with a hair suction function according to claim 1, which is characterized in that at least two limiting fasteners are set on front ends of the wing plates.

9. The electric hair clipper with a hair suction function according to claim 1, which is characterized in that at the rear end of the casing is removably connected a connecting pipe fitting.

* * * * *